Sept. 10, 1968 W. GIGER, JR 3,401,230

BUSWAY WITH FOAMED-IN-PLACE PLASTIC SEALING MATERIAL

Filed Aug. 5, 1966 3 Sheets-Sheet 1

INVENTOR
WALTER GIGER, JR.
BY Robert F. Casey
ATTORNEY

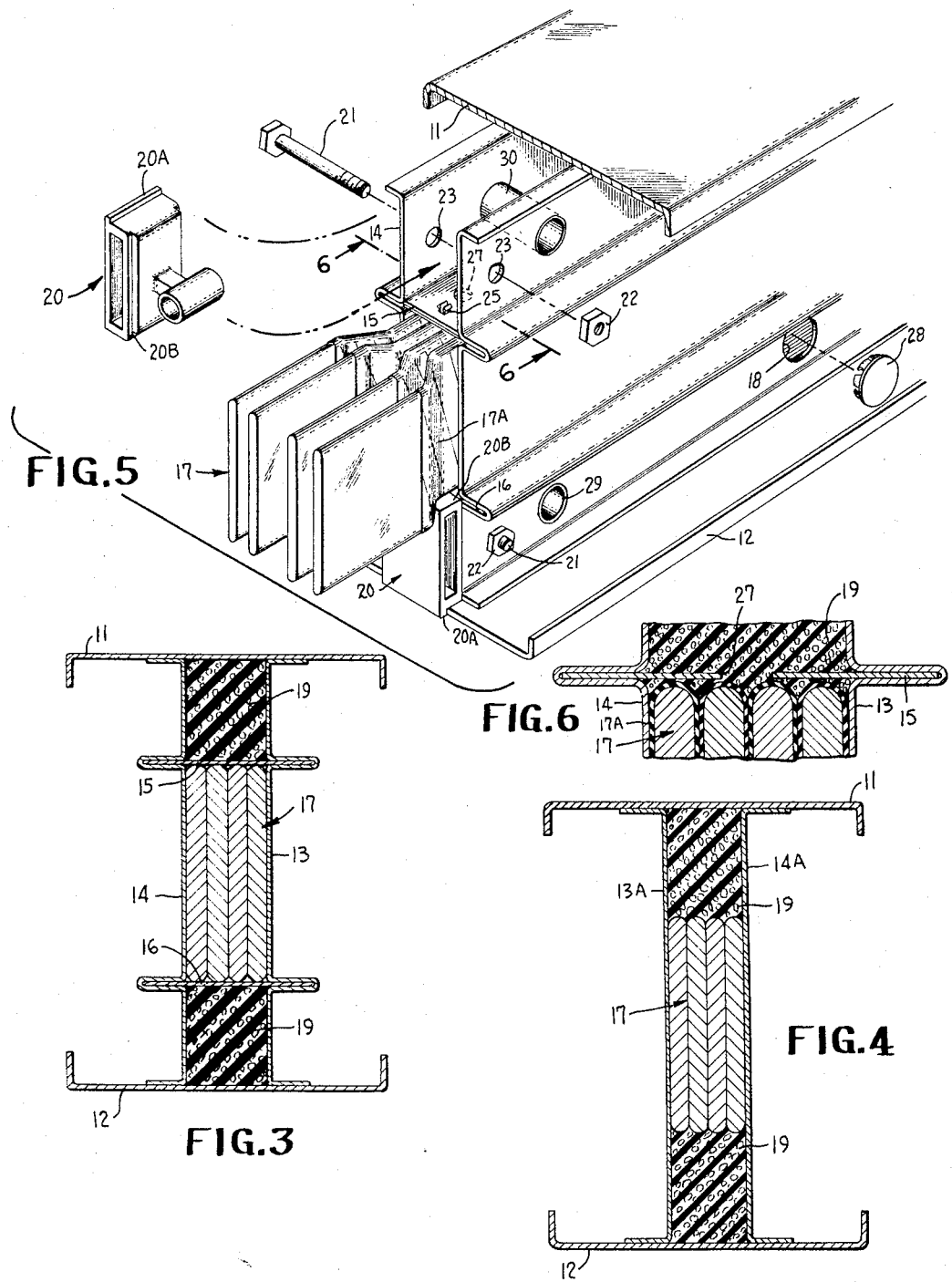

Sept. 10, 1968   W. GIGER, JR   3,401,230
BUSWAY WITH FOAMED-IN-PLACE PLASTIC SEALING MATERIAL
Filed Aug. 5, 1966   3 Sheets-Sheet 3
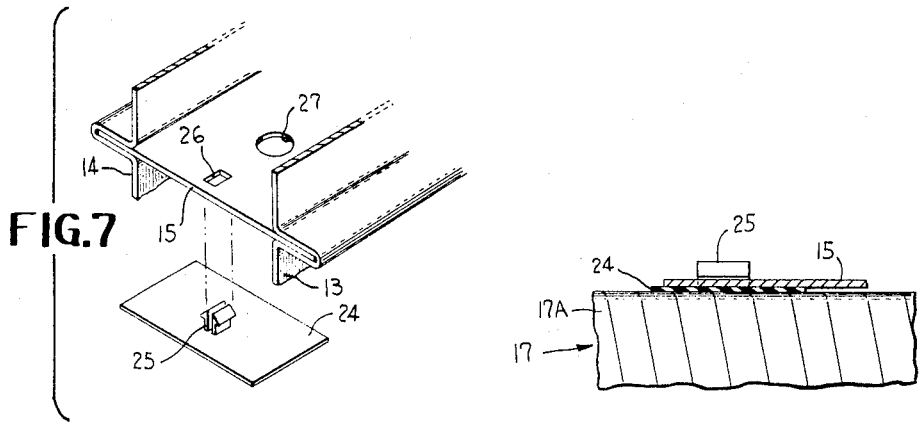
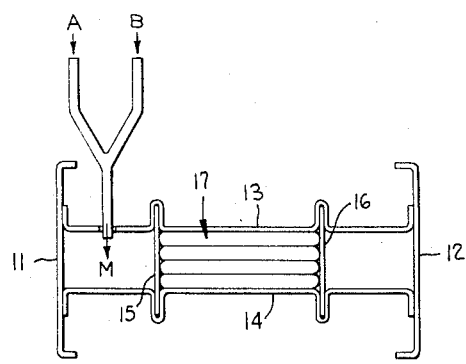
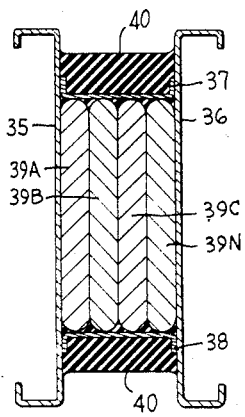
INVENTOR
WALTER GIGER, JR.
BY Robert F. Casey
ATTORNEY United States Patent Office 3,401,230
Patented Sept. 10, 1968

3,401,230
BUSWAY WITH FOAMED-IN-PLACE PLASTIC
SEALING MATERIAL
Walter Giger, Jr., West Hartford, Conn., assignor to General Electric Company, a corporation of New York
Filed Aug. 5, 1966, Ser. No. 570,600
7 Claims. (Cl. 174—98)

ABSTRACT OF THE DISCLOSURE

An electric power busway of the type including a rectangular duct with generally strap-like busbars supported therein having the portions of duct not occupied by the busbars filled with a foamed-in-place plastic material, such as polyurethane, polystyrene, or epoxy foam, thereby sealing the duct against the entry of moisture as well as preventing condensation of moisture therein.

BACKGROUND OF THE INVENTION

Field of the invention

My invention relates to electrical power distribution systems of the type comprising a plurality of busbars enclosed in an elongated metallic housing or duct and commonly referred to as "busways," and particularly to such busways which are suitable for outdoor use.

Description of the prior art

In accordance with prior art practice, electric power busways intended for use in outdoor or "weatherproof" installations have been of one of two general types of construction. In the first type, the metallic housing is constructed so that one side wall thereof, which becomes the top when the busway is in its mounted position, acts as a shield and prevents the entry of water into the busway. In accordance with the second type, the housing walls are provided with a large number of openings, and moisture is allowed to enter the busway housing but immediately drains through.

The technique of constructing the housing so that one wall thereof acts as a shield to prevent the entrance of moisture has serious disadvantages. With this type of busway, it is necessary to install the busway always in a predetermined orientation with respect to ground, i.e., the shielding side of the housing must be the "top." At times, however, it is desirable for space reasons, for better heat dissipation, etc., to mount the busway in a position where it is oriented 90 degrees rotated with respect to such a position. To supply such needs, a special construction must be utilized, having the shielding side in the position desired.

The ventilated housing busway structures of the prior art which are suitable for use in outdoor installations have been of the type having the busbar conductors mounted therein in spaced apart relation, that is, spaced apart from each other and from the housing. With this arrangement of busbars, the "ventilating" technique for outdoor installations is very satisfactory. In more recent busway designs, however, the insulated busbar conductors are placed in directly side-by-side contact relation with each other and with the metallic housing in order to improve the thermal dissipation, and therefore the overall capacity of the busway. This construction is known as the "close-stacked" arrangement. Busway constructions having the busbars in direct insulated contact with each other and with the busway housing, are shown in Patent No. 3,018,320, R. N. Rowe, and application Ser. No. 542,925, L. E. Fisher, both assigned to the same assignee as the present invention.

In busways of the "close-stacked" arrangement, moisture which enters the housing can become trapped in the small space between the busbars, and the presence of such moisture, combined with the heat normally generated by the busway in its operating condition, may cause deterioration of the insulating materials and possible failure. The same is true with regard to the spacing between the insulated busbars and the metallic housing. Therefore, it is not satisfactory to use the ventilated housing technique for outdoor or weatherproof installations.

Objects of the invention

It is an object of the present invention to provide an electric power busway of the type including a plurality of insulated busbars mounted in an elongated metallic housing which is suitable for use in outdoor applications or other installations where it may be subject to moisture, in which moisture is effectively prevented from entering between the busbars, and between the busbars and the housing regardless of closeness of spacing of the bars or of the bars and housing.

It is another object of the invention to provide an electric power busway of the type described which may be utilized in installations where it is subject to weather or moisture conditions and which is not "position-sensitive," i.e., which may be mounted with any desired side surface as the "top."

It is another object of the present invention to provide a busway which may be used in either outdoor or indoor installations which is economical to manufacture.

Another object of the invention is to provide a "weatherproof" busway construction which is not significantly heavier than a corresponding non-weatherproof busway.

A further object of the invention is to provide a weatherproof busway which can be easily manufactured and in which the weatherproofing aspects can be optionally omitted with no significant structural modifications required.

A still further object of the present invention is to provide a busway structure including insulating and/or sealing means which adds to the "beam" or flexural strength of the busway.

A further object of the invention is to provide a busway structure including insulating and/or sealing means which also significantly decreases noise and vibration of busbars.

Summary of the invention

In accordance with the invention in one form, there is provided a busway having an elongated rigid housing and a plurality of busbar conductors supported in insulated spaced relation therein. Extending the length of the housing, substantially co-extensive with the busbars, there is provided a filling of foam-like expanded plastic insulation material. This material substantially completely fills the otherwise vacant space between the busbar conductors and the elongated housing and seals any cracks or openings in the housing, against the entry of liquids.

In accordance with another aspect of the invention, there is provided a novel method of constructing an insulated electric power busway system. The method is useful in producing a busway of the type wherein a plurality of busbars are supported in insulated relation in an elongated metallic housing. In practicing the method, the busbars are supported in the housing in spaced relation thereto and a predetermined amount of a liquid material is introduced into the housing. The material is then caused to expand and "foam" in place within the housing, where it is transformed into "hardened" plastic material.

The invention will be more fully understood by reference to the following detailed description, taken in conjunction with the accompanied drawings, and its scope will be pointed out in the appended claims.

Brief description of the drawings

In the drawings,

FIGURE 3 is a sectional view of the busway section of FIGURE 1, taken substantially on the line 3—3 of FIGURE 2;

FIGURE 4 is a view similar to FIGURE 3, illustrating another embodiment of the invention;

FIGURE 5 is a fragmentary perspective, partially exploded, view of one end portion of the busway section of FIGURE 1 illustrating the structure for closing the end of the section housing;

FIGURE 6 is a fragmentary sectional view of the busway section of FIGURE 1, taken substantially on the line 6—6 in FIGURE 5, but showing plastic insulation material in place;

FIGURE 7 is a fragmentary perspective view showing a portion of the housing and an insulating guard member or insert employed to protect the insulated busbar conductors from the edges of the metallic "tie-plates" which form a part of the busway housing;

FIGURE 8 is a fragmentary sectional view showing the guard member of FIGURE 7 in mounted position;

FIGURE 9 is a semi-schematic view illustrating a method of introducing plastic insulation material into the busway housing, and FIGURE 10 is a sectional view of another embodiment of the invention.

Description of a preferred embodiment

Figure 1:
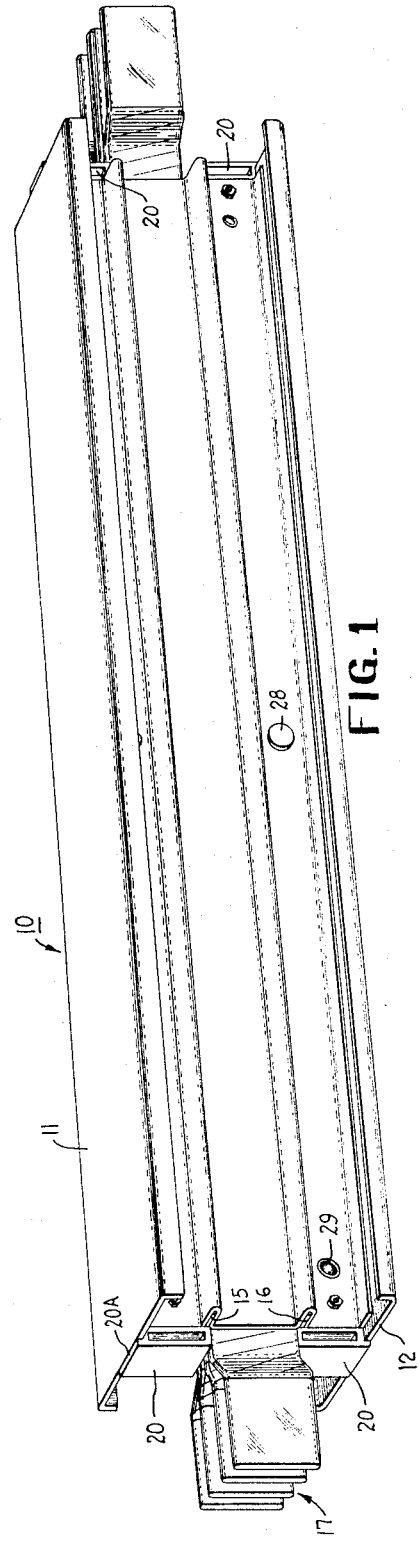
FIGURE 1 is a perspective view of a busway "section" incorporating the present invention.

Referring now to FIGURE 1, the invention is shown as incorporated in a prefabricated length or "section" 10 of busway. The busway section 10 includes an elongated rigid metallic housing comprising top and bottom plates 11 and 12, side plates 13 and 14, and tie-plates 15 and 16. As best shown in FIGURE 3, the tie-plates 15 and 16 interconnect intermediate portions of the side plates 13 and 14 and divide the housing into a first or central chamber and second and third chambers above and below the central chamber. The interconnection of the tie-plates and the side plates may be accomplished in any suitable manner, such for example as by welding. An assembly 17 of insulated busbar conductors is positioned in the central chamber and substantially completely fills the chamber.

In the illustrated embodiment, four busbars 17 are shown, such as used in a 3-phase power system, there being one bar for each phase, plus a "neutral" bar. The bars are individually insulated in any suitable manner. In the embodiment shown, the bars are insulated by a wrapping 17A of insulating tape. Other methods, such as a continuous sleeving mounted thereon, dip-coating, sprayed-on insulation, etc., may obviously be used. In order to protect the insulated bars 17 from the sharp edge of the tie-plates 15 and 16, insulation plates 24 are provided as shown in FIGURES 7 and 8. Each plate 24 has a pair of integral projections 25 which snap into openings 26 in the tie plates respectively, although other methods of retention may obviously be employed.

In accordance with the invention the second and third chambers are filled with a cellular foam-like plastic material. By "cellular" plastic material is meant a plastic material which has a substantially "closed" cellular formation substantially uniformly throughout. A common method of producing such materials is to "expand" a plastic resin starting material by chemical or mechanical action to a "closed" cellular form. Plastic materials which may be utilized in accordance with the invention include but are not limited to acrylic, cellulosic, epoxy, phenolic, polyethylene, polypropylene, polystyrene, polyurethane, silicone, urea-formaldehyde, and vinyl materials. As is well-known in the art, plastic foams having varying characteristics insofar as density, thermal conductivity, water permeability, strength, porosity, etc., may be obtained through the proper selection of the basic material along with the manner in which the material is expanded. Most of the plastic basic or starting materials are employed in liquid form, one of the exceptions being silicone, which is used as a powder which is capable of being poured, like a liquid. The term "fluid" is employed hereinafter in this connection to mean either liquid or powder.

A foaming agent such as carbon dioxide, or a blowing agent such as an inert gas such as a fluorocarbon gas may be employed to expand the material. These agents cause an action to take place whereby the plastic material foams "in-place," thereby forming a foam-like plastic material. Normally, the expansion takes place at ordinary room temperature. It is also possible, however, to employ heat to cause the blowing agent to expand and disperse throughout the plastic material, whereby a foam-like expanded plastic material is obtained. Polystyrene foams, for example, may be formed in this manner, in which case beads of polystyrene resin are caused to expand through the application of heat. It is also possible to cause the resinous or basic material to expand by dissolving a gas in the material while it is under pressure. The material is then permitted to rapidly return to atmospheric pressure, thereby allowing the dissolved gas to escape from the material as bubbles. During the release of the bubbles of gas, the material foams forming a hardened foam-like plastic material.

Further information concerning plastic foam materials and methods of using them may be found in the article "Plastic Foams" printed in the May 1966 issue of the publication entitled "Materials in Design Engineering" and in the publications cited therein.

Figure 2:
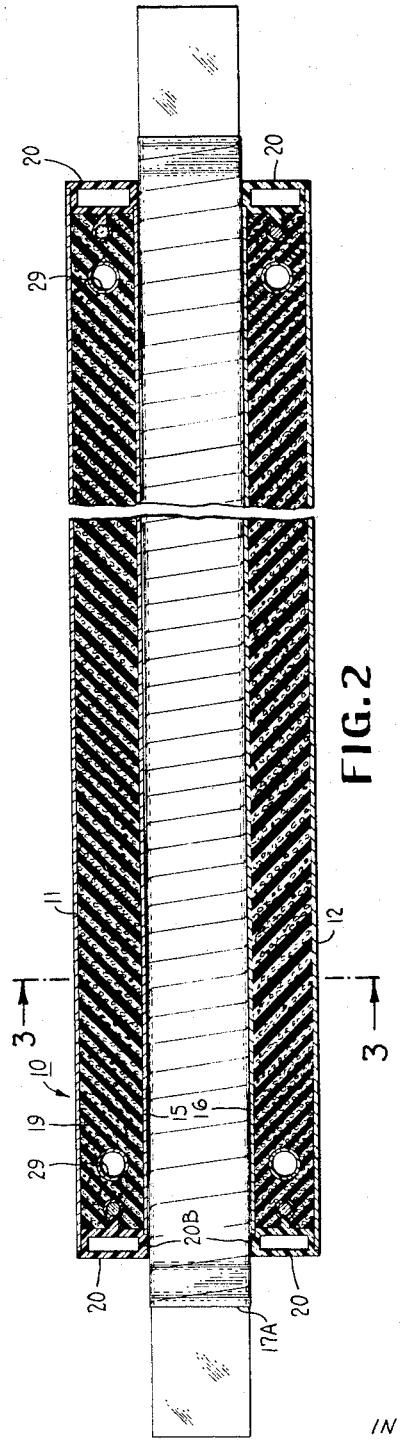
FIGURE 2 is a sectional view of the busway section of FIGURE 1.

In the preferred embodiment of the present invention, a polyurethan resin plastic material is employed. This material is introduced in liquid form into the busway housing through openings 18. As previously noted, different "foaming" techniques may be utilized. In accordance with a preferred form of the invention, the basic resin A is introduced into the housing simultaneously with the "foaming" or "blowing" agent B, and mixed therewith as it enters the housing, as shown in FIGURE 9. In order to prevent the fluid plastic material from flowing out of the ends of the busway section, closure members 20 are utilized. Referring particularly to FIGURE 2, it can be seen that when secured in place, the lip portion 20A of each closure member 20 is in juxtaposed relation to either the top plate 11 or the bottom plate 12 thereby ensuring a tight fit. Similarly, each member 20 is provided with a recessed portion 20B which fits against a guard member 24. These members 20 which are of plastic molded material and preferably from a cost standpoint have a hollow construction, seal the second and third chambers, respectively at each end of the busway section. The members 20 are secured in place, in the form of the invention illustrated, by means of bolts 21 passing through the openings in the tubular portions projecting from the rear of the members 20 and through openings 23 in the side plates 13 and 14. Closure caps 28 may be snapped in place to close the openings 18 after the fluid plastic material has been introduced into the housing.

After the mixture of plastic resin and foaming agent is introduced into the second and third chambers, respectively, the material foams and expands to form a hardened plastic material. In its hardened plastic form, the material 19 extends the entire length of the elongated busway housing, substantially completely filling the second and third chambers respectively. The volume of material introduced in liquid form into the chambers is very carefully controlled so that it fills these chambers and exerts a predetermined amount of pressure against the surfaces with which it makes contact. This ensures that the material will completely fill the seams or cracks at the interconnection of the top and bottom plates 11 and 12 with the side plates 13 and 14, and between the tie plates 15 and 16 and the side plates 13 and 14. This provides a watertight and hence "weatherproof" assembly.

It is an important, and in fact crucial, aspect of the invention that the foam-like plastic material selected for use in "weatherproof" or "waterproof" applications is of the "closed" cellular type, that is, although some of the cells therein may communicate with each other, there is no continuous intercommunication between cells such as to permit the passage of liquid therethrough. In other words, the material is essentially impervious to liquid. Such material is to be distinguished from materials having intercommunicating cellular structure, of the type used for example as sponges.

It should be understood, however, that while the "closed" cellular structure type foam-plastic materials as described above are necessary in accordance with the invention for those forms where moisture sealing is the desired aspect of construction, various other advantages of expanded plastic foam filling may be obtained with "open" type materials when moisture sealing is not a critical necessity. Thus, as described elsewhere herein, expanded foam plastic materials may usefully be employed to impart deadening of sound, added flexural strength, minimizing of vibration of bars, etc.

It also will be appreciated that a certain degree of porosity or perviousness may be tolerated even in installations intended for outdoor use.

In the preferred form of the invention, an expanded plastic material is utilized which is 85% closed, i.e., at least 85% of the cells therein are closed. It will be understood that the material may be permeable to air and to water vapor, but it is substantially impermeable to water in liquid form. Thus, with the above-identified material, samples submerged for five days in water containing a dye showed penetration of the water as shown by penetration of the dye color of less than $\frac{1}{16}$ inch.

To afford even further protection to the busbar conductors against moisture, the tie-plates 15 and 16 are provided with openings 27 to permit the plastic material to pass through and to flow around the edges of the busbar conductors 17, as shown particularly in FIGURE 6.

Thus, substantially all the space between the assembly 17 of busbar conductors and the members comprising the busway housing is filled with the foam-like expanded plastic material. Since all otherwise unoccupied space present in the interior of the busway housing is filled, moisture and contamination which otherwise might find its way therein is also effectively precluded.

It will be appreciated that if the exclusion of condensation is of no great concern, the space in the housing may be only partially filled with plastic material. Also, in such case, the plastic material need not necessarily be of the cellular or "foam" type.

Referring to FIGURE 10, the invention is shown in another embodiment comprising a busway section made up of generally channel-shaped side pieces 35, 36, and connecting top and bottom plates 37, 38 attached thereto by suitable means such as by welding. A number of insulated busbars 39A, 39B, 39C and 39N are arranged in side-by-side contacting arrangement between the side walls 35, 36.

In order to render the section watertight and hence weatherproof, a plastic compound 40 is poured into the channel-shaped recesses formed by the upper and lower portions of the sides 35, 36 and the top and bottom plates 37, 38 respectively, one recess being filled and the material allowed to harden, at a time. For this purpose either cellular or non-cellular plastic material may be used. The non-cellular type will probably be generally found preferable as being of lower cost and perhaps easier to handle and use. In either case, the volume of material used is such as to completely cover the seams or cracks between the top and bottom plates 37, 38 and the side walls. In addition, the material is preferably selected to adhere to the material used for the housing side plates 35, 36, or special materials and processing may be utilized as well understood in the art, to gain such adhesion.

The top and bottom plates 37, 38 preferably have holes therein to permit the entrance of the plastic material into the small space between the round-edge insulated bars and the plates 37, 38.

If desired, the structures shown in FIGURES 3 and 4 may be only partially filled with plastic so as to seal the bars watertight, but it will be observed that the construction shown in FIGURES 3 and 4 have two important advantages: (1) since the chamber being filled is closed, the amount of expandable plastic material utilized can be chosen as previously noted, so as to give a controlled amount of positive pressure in such chamber prior to complete hardening of the material. This forces the material into any cracks and completely seals them. Secondly, the complete filling of the closed chambers in the form of FIGURES 3 and 4 ensures against condensation of moisture therein.

A further advantage derived from the utilization of this foam-like expanded plastic insulation material is that it increases the flexural or "beam" strength of the housing without greatly increasing the weight of the busway. Since such busway is ordinarily mounted in overhead locations by spaced supports, this is of significant value. Also among the advantages obtained from the present invention is that the foam-like plastic insulation material acts as a dampener of sound. This is an advantage in those instances when the busway carries an unbalanced three-phase load wherein circulating eddy currents may produce a hum.

In FIGURE 4, there is shown a sectional view of another embodiment of busway similar to that of FIGURE 3 except for the omission of tie-plates 15 and 16, and the use of straight-side plates 13A and 14A. Here also, the plastic insulation material 19 is introduced into the space existing on either side of the assembly 17 of busbar conductors by means of openings (not shown) in the side plates 13A and 14A. As shown in FIGURE 4, the plastic insulation material when expanded and hardened substantially completely fills the space within the side plates 13A and 14A, and between the assembly 17 of busbar conductors and top and bottom plates 11 and 12, respectively.

In some outdoor installations, the busway is mounted on its side, that is, with one of the side plates 13, 14 uppermost rather than the top plate 11. To facilitate the drainage of water from the external surfaces of the busway in these instances, holes 29 may be provided in the side plates of the busway housing. These holes constitute hollow metallic cylinders 30 which are secured between the side plates 13, 14 at each end thereof by any suitable means.

While the specific embodiment of the invention shown has included an assembly of four busbar conductors, it will be obvious that more or fewer conductors may be used. Similarly, while polyurethane resin has been disclosed as the plastic material employed in the embodiment of the invention shown herein, polystyrene resin would be suitable for applications involving lower temperatures, and epoxy resin for those involving higher temperatures. I, therefore, intend by the appended claims to cover all such modifications as fall within the true spirit and scope of the invention.

What I claim as new and desire to secure by Letters Patent of the United States is:

1. Electric power busway apparatus comprising:
 (a) an elongated rigid metallic housing;
 (b) said housing having flat side plates spaced in parallel relation to each other;
 (c) a plurality of busbars supported in said housing;

(d) said housing having tie-plates interconnecting intermediate portions of said side plates above and below said busbar assembly, and defining a central chamber therebetween;
(e) said housing having top and bottom plates interconnecting said side plates in spaced relation to said tie-plates, and defining therewith second and third chambers, respectively and
(f) a homogeneous cellular plastic insulation material extending substantially the length of said housing and substantially completely filling said second and said third chambers, respectively.

2. An enclosed electrical power busway as defined in claim 1 wherein said tie-plates have openings therein to permit the flow of said plastic insulation material into said first chamber from said second and said third chambers, respectively.

3. Electric power busway apparatus comprising:
(a) an elongated rigid housing of sheet metallic material of predetermined length and having at least one seam extending longitudinally thereof;
(b) a plurality of electrical conductors supported in said housing and extending substantially from end-to-end thereof;
(c) said housing having a predetermined cross-sectional area, and said conductors occupying substantially less than all of said cross-sectional area;
(d) insulating material in said housing filling substantially all of said cross-sectional area not occupied by said conductors;
(e) said insulating material being introduced into said housing in the form of a fluid of predetermined volume and thereafter changing within said housing to a solid homogeneous cellular plastic of volume substantially greater than said predetermined volume;
(f) said predetermined volume of said fluid introduced into said housing being such as to cause said material to completely fill all available space within said housing when expanded and to exert a predetermined pressure against the inner surfaces of said housing whereby to propel said plastic material into said seam all along said length prior to complete hardening of said material.

4. Electric power busway apparatus comprising:
(a) an elongated rigid housing of predetermined cross-sectional area;
(b) a plurality of electric conductors supported in said housing and extending substantially from end-to-end thereof;
(c) said conductors occupying less than all of said cross-sectional area of said housing;
(d) a filling of insulating material in said housing and extending substantially from end-to-end thereof, said insulating material occupying substantially all of said cross-sectional area of said housing not occupied by said conductors;
(e) said filling of insulating material comprising a homogeneous cellular plastic material, and
(f) said material being introduced into said housing in the form of a fluid of predetermined volume substantially less than the said volume of said housing unoccupied by said conductors and being transformed within said housing to fill substantially all of said unoccupied volume.

5. Electric power busway apparatus comprising:
(a) an elongated rigid housing of sheet material;
(b) a plurality of electric busbar conductors supported in said housing and extending substantially from end-to-end thereof;
(c) said housing having at least one seam extending lengthwise thereof substantially from end-to-end thereof;
(d) a filling of non-metallic sealing material supported by said housing and extending substantially from end-to-end thereof in the area adjacent said seam, said sealing material covering said seam and preventing the entrance of liquids into the portion of said housing containing said busbar conductors; and
(e) said sealing material comprising a plastic material applied to said housing in fluid form and transformed in place to a non-flowing solid mass substantially impervious to water.

6. Electric power busway apparatus comprising:
(a) an elongated rigid housing of sheet material;
(b) a plurality of electric busbar conductors supported in said housing and extending substantially from end-to-end thereof;
(c) said housing comprising at least two pieces of said sheet material fastened together along two seams extending substantially parallel to each other and substantially from end-to-end of said housing;
(d) said housing having a longitudinal recess formation therein extending substantially from end-to-end of said housing adjacent each of said seams;
(e) a filling of non-metallic sealing material supported by said housing in said recess and extending substantially from end-to-end of said housing, said sealing material covering said seams respectively and preventing entrance of water into said housing;
(f) said sealing material being applied to said recess in fluid form and irreversibly transformed in place to a non-flowing solid mass substantially impervious to water; and
(g) said material having a substantially closed cellular structure after transformation from said fluid to said solid form.

7. Electric power busway apparatus comprising:
(a) an elongated rigid housing of sheet metallic material of predetermined length and having at least one seam extending longitudinally thereof;
(b) a plurality of electrical busbar conductors supported in said housing and extending substantially from end-to-end thereof;
(c) said housing having a predetermined cross-sectional area, and said busbar conductors occupying substantially less than all of said cross-sectional area;
(d) insulating means extending substantially the length of said elongated housing, and filling at least a portion of the space between said busbar conductors and said housing; and
(e) said insulating means being a homogeneous cellular plastic insulation material.

References Cited

UNITED STATES PATENTS

| | | | |
|---|---|---|---|
| 442,162 | 12/1890 | Young | 174—98 |
| 2,780,350 | 2/1957 | Simon et al. | 174—110.8 X |

LARAMIE E. ASKIN, *Primary Examiner.*